US006829555B2

(12) United States Patent
Penschuck et al.

(10) Patent No.: US 6,829,555 B2
(45) Date of Patent: Dec. 7, 2004

(54) METHOD AND ARRANGEMENT FOR MONITORING THE EMISSIONS DURING OPERATION OF A SUPPLY VESSEL FOR SUPPLYING A VOLATILE MEDIUM INCLUDING A FUEL SUPPLY TANK OF A MOTOR VEHICLE

(75) Inventors: Juergen Penschuck, Tamm (DE); Uwe Dworzak, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/228,209

(22) Filed: Aug. 27, 2002

(65) Prior Publication Data

US 2003/0037599 A1 Feb. 27, 2003

(30) Foreign Application Priority Data

Aug. 27, 2001 (DE) ........................................ 101 40 954

(51) Int. Cl.[7] .......................... G06F 19/00; G01K 13/00

(52) U.S. Cl. ........................... 702/130; 702/51; 702/99; 702/131; 702/136

(58) Field of Search ............................. 702/34, 51, 99, 702/113, 130, 131, 136; 123/520, 525, 527, 575, 579, 526; 73/49.2, 52

(56) References Cited

U.S. PATENT DOCUMENTS

| | | | | | |
|---|---|---|---|---|---|
| 5,411,004 | A | * | 5/1995 | Busato et al. | 123/520 |
| 5,890,474 | A | | 4/1999 | Schnaibel et al. | |
| 6,095,793 | A | * | 8/2000 | Greeb | 431/12 |
| 6,131,550 | A | | 10/2000 | Fritz et al. | |
| 6,196,203 | B1 | * | 3/2001 | Grieve et al. | 123/520 |
| 6,234,152 | B1 | * | 5/2001 | Fritz et al. | 123/520 |

* cited by examiner

*Primary Examiner*—Bryan Bui
(74) *Attorney, Agent, or Firm*—Walter Ottesen

(57) ABSTRACT

A method monitors the emissions of a supply vessel storing a volatile medium during operation including a fuel supply tank of a motor vehicle. A tightness check of the supply vessel is carried out from time-to-time. The temperature of the medium is determined based on at least one characteristic variable utilizing a model computation from time-to-time or cyclically. Either the temperature is utilized in the tightness check or the tightness check is carried out only when the determined temperature of the medium lies within a pregivable temperature interval.

20 Claims, 7 Drawing Sheets

Continued Fig. 2b

METHOD AND ARRANGEMENT FOR MONITORING THE EMISSIONS DURING OPERATION OF A SUPPLY VESSEL FOR SUPPLYING A VOLATILE MEDIUM INCLUDING A FUEL SUPPLY TANK OF A MOTOR VEHICLE

FIELD OF THE INVENTION

The invention relates to monitoring the emissions of a supply vessel for storing a volatile medium including a fuel tank system mounted in a motor vehicle. The invention relates especially to a method, a circuit as well as a control apparatus for monitoring the emissions of such a supply vessel during operation.

BACKGROUND OF THE INVENTION

In various areas of technology, supply vessels of the above-mentioned kind have to be checked with respect to their tightness. Accordingly, it is important, for example, in chemical processing technology to check the tightness of tanks for keeping volatile chemical substances for reasons of emission protection. The necessity is especially present in the area of motor vehicle technology to regularly carry out tightness checks on fuel tanks or fuel tank systems utilized in motor vehicles.

In the last-mentioned context, reference is made to the statutory regulations present in parts of the United States for the operation of internal combustion engines. According to these regulations, it is necessary that motor vehicles, which utilize volatile fuels such as gasoline, have a device for monitoring the emission of fuel which can detect a non-tightness or leakage of the size of 0.5 mm in the tank system utilizing only on-board equipment.

U.S. Pat. No. 6,234,152 discloses a method for checking the tightness of a vehicle tank system. Here, an overpressure relative to ambient pressure is introduced into the tank system and a conclusion as to a leakage is made from the subsequent trace of the pressure. Similar methods for checking a tank-venting system of a motor vehicle are presented in U.S. Pat. Nos. 5,890,474 and 6,131,550.

SUMMARY OF THE INVENTION

In the above-mentioned monitoring of emissions and especially the detection of the smallest leakages of the above-mentioned cross section of 0.5 mm, the invention is based on the recognition that the temperature of the volatile medium has a considerable influence on the measuring accuracy in a tightness check (leakage diagnosis). On the one hand, the above-mentioned operational checks, especially in tank systems, should be carried out only within a specific temperature range because, with increasing fuel temperature, the vaporization of the medium increases and, starting at a specific temperature, an overpressure develops in the supply vessel because of vaporization and this overpressure increases the overpressure generated in the tightness check or counters the generated underpressure. In this way, incorrect assumptions with respect to the pressure conditions define a reason for incorrect diagnoses. Accordingly, in the case of a diagnosis carried out with overpressure, an un-tight supply vessel is diagnosed as "tight" and in a diagnosis carried out with an underpressure, a vessel which is indeed tight is erroneously diagnosed as "un-tight".

In addition, especially for vessels manufactured of plastic, the thermal expansion of the material is to be considered.

Based on the expansion characteristic of the plastic, which occurs with increasing temperature, uncontrollable volume changes of the interior vessel space occur and therefore, in turn, incorrect assumptions with respect to the existing internal pressure conditions result.

It is further noted that the term "supply vessel" (for example, in the case of motor vehicle tank systems) includes also function elements, which are significant for the entire tank system, such as lines and seals.

In view of the foregoing, it is an object of the invention to provide a method, a circuit and a control apparatus of the kind set forth initially herein which make possible a monitoring of emissions in supply vessels which is improved compared to the state of the art. Especially, this improvement should be achieved by detecting the actual temperature of the supplied medium with the least possible technical complexity especially by avoiding the use of costly temperature sensors in the supply vessel in order to increase the accuracy of a tightness check carried out on the supply vessel.

The method of the invention is for monitoring the emissions of a supply vessel storing a volatile medium during operation including a fuel supply tank of a motor vehicle. The method includes the steps of: carrying out a tightness check of the supply vessel from time-to-time; determining the temperature of the medium based on at least one characteristic variable utilizing a model computation from time-to-time or cyclically; and, either utilizing the temperature in the tightness check or carrying out the tightness check only when the determined temperature of the medium lies within a pregivable temperature interval.

The invention is based on the idea to include the temperature of the volatile medium in a function check described initially herein as a corrective quantity and model this corrective quantity based on additional characteristic variables, that is, determine this corrective quantity based on a model computation. The additional characteristic variables include variables such as the ambient temperature, the fill level of the supply vessel or, in the case of a motor vehicle, additionally, operating data of the vehicle (vehicle speed or the like) or of the vehicle engine (duration of operation, the length of time an engine has been switched off, engine temperature or the like).

According to a first variation, the invention provides to mathematically determine the real temperature of the medium (T_ktm) from these characteristic variables and to include the value of T_ktm which is so computed as a corrective quantity in the check of the operability of the supply vessel as mentioned above. In a second variation, a check as to operability of the supply vessel is only carried out when the computed value of T_ktm lies within a pregivable temperature interval.

In the above-mentioned variations, the corrective quantity can be determined by means of the model computation before each execution of an operational check or from time-to-time, for example, cyclically. Alternatively, the characteristic variables, which are necessary for the computation of T_ktm, can be stored after a one-time executed model computation in the form of a characteristic variable diagram or in a corresponding table especially for a given construction type of the supply vessel or of a motor vehicle. In this way, the characteristic variables are directly available for subsequent determinations of T_ktm without it being necessary to carry out the above-mentioned model computation anew.

For further refining the suggested method, characteristic variables can be included in the model computation and these characteristic variables include the operation duration or switch-off duration of an internal combustion engine, which is supplied by the supply vessel, as well as, in the case of a vehicle, the road speed, the fuel level in dependence upon the vehicle speed and/or the elevation of the supply vessel or a vehicle having such a vessel. For falling ambient temperatures at a simultaneously relatively high geographic elevation of the vehicle (for example, during travel through mountain passes), one can assume a reduced rate of cooling because of the reduced air pressure. In addition, for vehicles, the characteristic data concerning the particular vehicle manufacturing series can be included such as the type of chassis and/or type of engine. In this way, the following can advantageously form a basis: different flow conditions for a moving vehicle and a different underflow of a vehicle tank caused thereby as well as different mounting positions of the fuel tank and/or of the engine in the vehicle chassis in dependence upon the chassis form. When a shut-down duration of the engine is included in the model computation, it can be provided to store a cool-down curve specific to the model series and to apply this curve as a starting value for the engine temperature when the engine is started again.

It is noted that the warming curve and/or the cool-down curve of the medium in the supply vessel, which is to be considered in the context of the model computation, in a motor vehicle and in other uses of the supplied vessel, are dependent from the present fill level as well as on the particular manufacturing series of the vessel. Accordingly, a relatively high fill level leads to a slower warming of the stored medium because of the correspondingly high thermal capacity of the medium and a relatively low fill level leads to a more rapid warming. In the above-mentioned model computation, these interrelations are considered in accordance with a further embodiment.

The ambient temperature can be considered in the determination of T_ktm (for example, multiplicatively) because the particular ambient temperature, the warming curve and the cool-down curve of the medium have considerable influence. In the case of a fuel vessel mounted in a motor vehicle, the following can be considered or be included as corrective variables in the warming curve and/or cool-down curve: vehicle operating variables and/or engine operating variables (such as the instantaneous or average engine load), vehicle road speed and/or the selected transmission gear.

In a further embodiment, T_ktm is only determined from one or several characteristic variables when the above-mentioned characteristic variables lie within a pregivable variant range, that is, when the particular characteristic variable performs sufficiently constant over a pregivable time interval. Alternatively or in addition, it can be provided that a new determination of T_ktm takes place only when the vehicle speed and/or the duration of operation of the engine exceeds a pregivable limit value. In this way, it is ensured that the influence of fluctuations of the detected characteristic variables, which are caused by a situation or the environment, is minimized to the value of T_ktm which was computed from these characteristic values. In this way, it is ensured that the engine has reached the operating temperature and that a subsequent warming of the engine leads to no further increase of T_ktm. The waiting time can be fixed in dependence upon engine type and/or chassis form of the vehicle, for example, separately for individual vehicle series.

To further increase the reliability of the function check, it can be provided that a T_ktm (which is determined during operation of an engine connected to the supply vessel or determined in the operation of a vehicle having such a vessel) is intermediately stored and is compared to an instantaneous ambient temperature which is measured for a subsequent starting of the engine or of the vehicle. Until the subsequent new determination of T_ktm, the particular greater of the two values is applied as the start value for T_ktm. With this maximum selection, an external heating of the stored medium is considered during a shutoff time of the vehicle, for example, based on a warming of the chassis and/or of the tank caused by solar radiation. Likewise, the influence of the specific geographical position in elevation of the vehicle can be considered.

In accordance with a further configuration, T_ktm is also determined during travel of the vehicle in order to consider the influence of the thermal backup on the fuel temperature. This thermal backup occurs during operation of the engine in the vicinity of the tank.

In addition, the thermal inputs of an electric fuel pump, an engine exhaust-gas system and/or a climate control, which cools the interior of the vehicle, can be considered.

T_ktm can also change after a tanking operation with a medium having a deviating temperature. For this reason, and in accordance with a further embodiment, changes of the tank fill level after a tanking operation are detected, which tanking operation is detected in a manner known per se, for example, by means of a tank cap sensor. As mentioned above, the adjustment of a temperature equilibrium can be awaited until a new determination of T_ktm takes place. Until the new determination, an approximation value (for example, the mean value from the last-stored value of T_ktm and the current ambient temperature) can form the basis which affords the advantage that an adequate value is present at least until that time. Furthermore, a tanking operation, which takes place during an interruption of the operation of the vehicle, can be detected in that, after the start of the engine, the difference between the current tank fill level and the intermediately-stored tank fill level value exceeds a pregivable threshold value. It is noted that the quantity of the after-tanked medium can be included in the model computation when T_ktm is newly computed after a tanking operation.

In the result, the invention makes possible the use of cost-effective plastic tanks, for example, in combustion-driven motor vehicles without an expensive temperature sensor mounted in the supply vessel and required for a leakage diagnosis of the size of 0.5 mm. For motor vehicles driven with flexible fuel (that is, in hybrid operation, ethanol/methanol), the invention makes possible the detection of critical vapor temperatures.

Furthermore, when there is a fault of one or several sensors (temperature sensor, tank fill level sensor, et cetera), nonetheless the determination of a useable T_ktm is made possible from the data being available. If, for example, the malfunction of a temperature sensor is recognized in the manner known per se, a substitute value, which is determined empirically in the model equation (for example, a mean value of 20° C.) can be assigned to the corresponding temperature variable. Correspondingly, for a defective fill level sensor, a last stored value of T_ktm can be applied in lieu of an actually determined T_ktm value.

In order to suppress still more effectively incorrect T_ktm values in the mentioned sensor malfunction or to avoid such falsifications for intensely changing ambient conditions, a plausibility check can be additionally carried out wherein an actually determined T_ktm is compared to pregivable upper and/or lower limit values and is only assumed to be correct when T_ktm lies within these limit values. Additionally, and when a limit value is exceeded, the actual value can be assumed equal to the limit value.

The invention can be advantageously realized in an existing control apparatus, for example, an engine control apparatus, in the form of a control program. Here, it is advantageous that some or all of the above-mentioned characteristic values are already detected and present in such a control apparatus. Alternatively, the invention can be realized in the form of a circuit, for example, as an application specific integrated circuit (ASIC). The basis-forming model computation can be realized in the form of a binary-logic circuit loop formed of several stages. Each stage is viewed as a filter for the influence of the particular characteristic value on T_ktm. The attenuation of the particular filter is dependent upon the characteristic variables and the corrective variables which are dependent upon the ambient. Preferably, at least two filters form the basis in the model computation. Accordingly, in a first filter, the ambient air temperature as well as the position in elevation of the vehicle are included and, in the second filter, the tank fill level, the vehicle shutoff time and/or the engine shutoff time and the duration of operation are included.

In one embodiment, the control apparatus included in the invention or the circuit includes a read/write memory (RAM) for storing the above-mentioned characteristic variable diagrams and/or for intermediately storing a T_ktm value which is already determined. The read/write memory serves the above-mentioned purpose.

The invention is basically applicable in supply vessels in all areas of technology wherein volatile substances are stored in such vessels. In addition, it is understood that the term "storage vessel" also includes tank systems or the like including their additional components.

The value for T_ktm, which is determined in accordance with the invention, can also be used as a corrective quantity in similar functions such as the above-mentioned function check, for example, for a tank-venting function mentioned initially herein.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
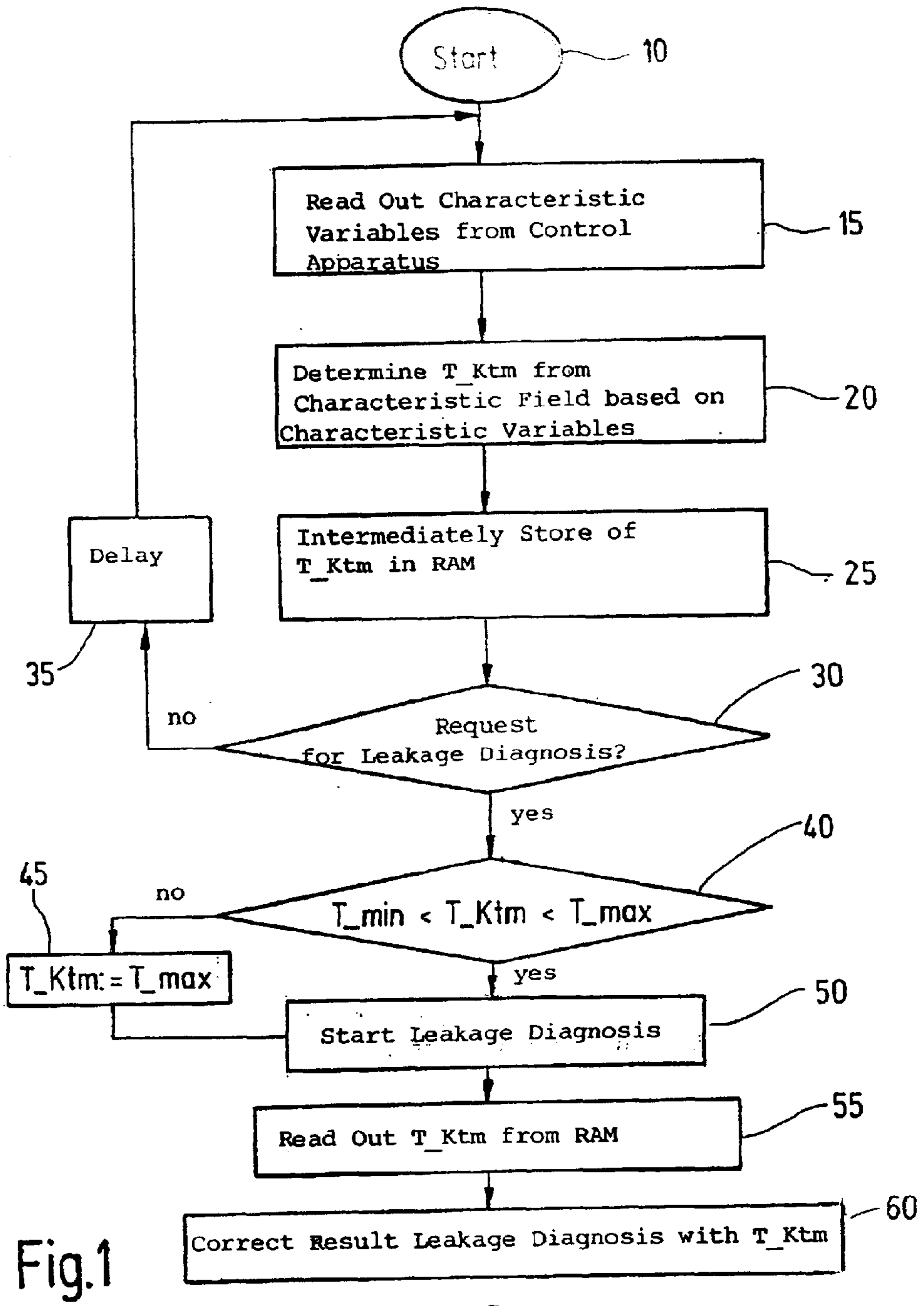
FIG. 1 is a flowchart of a tank leakage diagnosis using the method according to the invention.

FIG. 1 shows the basic sequence of a leakage diagnosis routine making use of the invention. After the start of the routine (block 10) and under the assumption that characteristic variables are already present in a control apparatus (for a motor vehicle, usually an engine control apparatus), these characteristic variables are read out from the control apparatus (block 15) and, on the basis of a characteristic variable diagram described hereinafter in detail, the temperature of the stored medium T_ktm is determined (block 20). This value T_ktm is intermediately stored in a rewritable memory, for example, a read-only-memory (ROM) (block 25). Thereafter, an inquiry (block 30) is made in a loop as to whether there is a request present for carrying out a leakage diagnosis. If this is not the case, then there is a return to the start of the subroutine for determining T_ktm via a delay stage 35. Otherwise, a plausibility check (block 40) is carried out as to whether the intermediately stored value of T_ktm lies within pregiven limits (T_min, T_max). If T_ktm lies outside of these temperature limits, then T_ktm is set equal to the maximum value T_max in the embodiment in order to correspond to the worst-case value as a safety measure.

In the next step 50, a leakage diagnosis operation is started and the value of T_ktm is again read out from the RAM and, when a result of the leakage diagnosis is present, this result is recorrected utilizing T_ktm. Here, a leakage rate, which is determined during the leakage diagnosis, can be corrected via a corresponding offset value based on an increased material vaporization factor based on the wall material of the supply vessel or based on the seals used in total. Here too, an underpressure reducing gradient or overpressure reducing gradient can be correspondingly corrected which is assumed in the leakage diagnosis.

A method for determining the fuel temperature is described in the following on the example of a motor vehicle even though the principles can also be used correspondingly in other supply vessels such as chemical substance tanks or the like. These principles will become clear from the following description. The method, which is shown in the connected FIGS. 2*a* to 2*d*, can, for example, be implemented as a control program in an engine control apparatus or as a suitable circuit (ASIC) or the like. Here, the method steps which follow including the described filter, et cetera, can be implemented in a binary logic known per se.

Figure 2A:
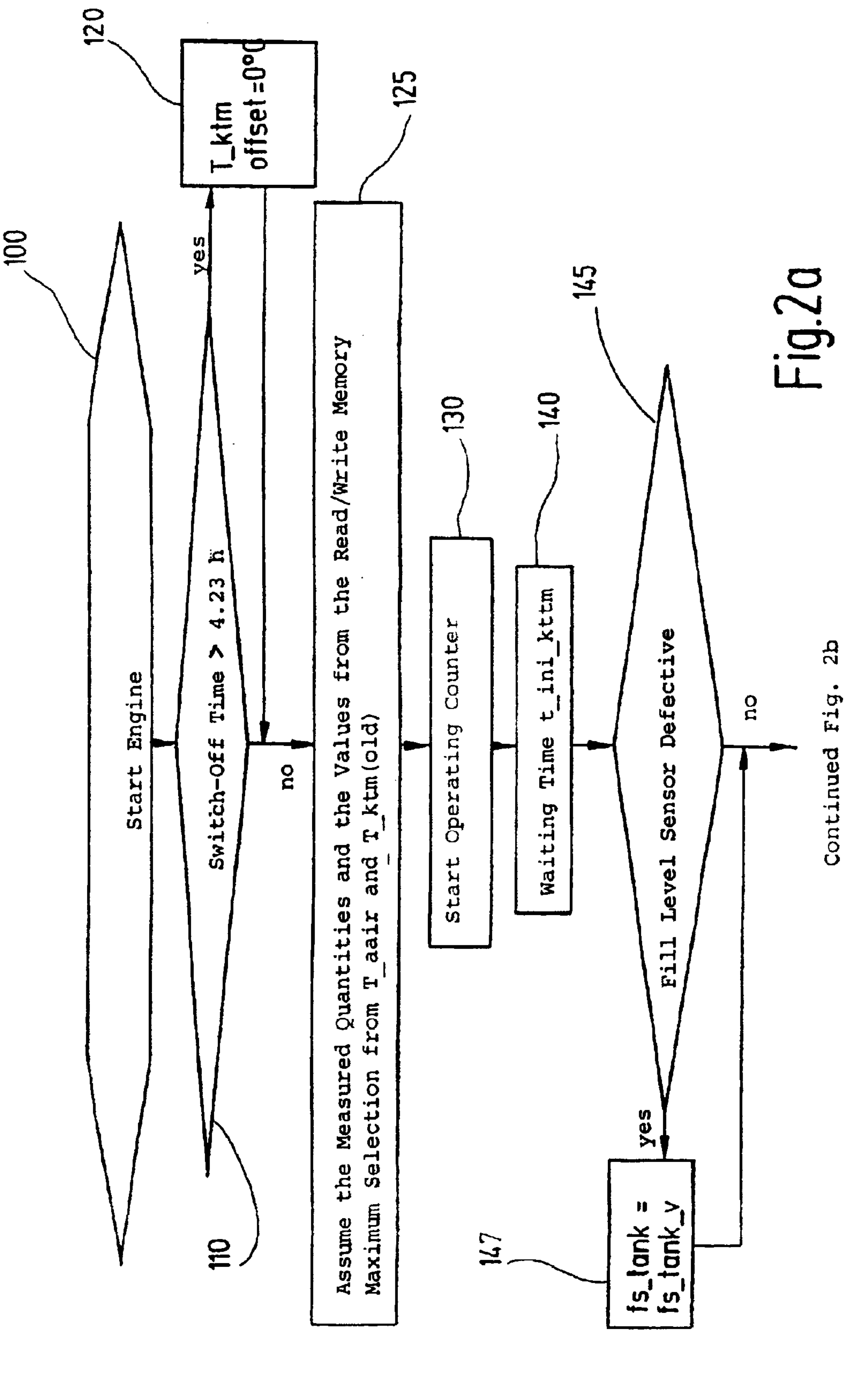
FIGS. 2*a* to 2*d* show a flowchart of the method of the invention for determining the fuel temperature from the ambient temperature.

The method starts in FIG. 2*a* with step 100 wherein an engine (not shown) is started. In step 110, a check is made as to whether the engine shutoff time t_maz is longer than a pregiven time. If this is so, then one assumes the fuel temperature has adapted to the ambient temperature after a trip through a mountain pass, and, in step 120, the value 0° C. is assigned to the temperature offset T_ktm_offset which is stored in a read/write memory and the method is continued in step 125.

If, in contrast, the engine shutoff time t_maz is shorter or equal to the pregiven time, then measurement values and stored values are taken over from the read/write memory in step 125 and a maximum selection takes place between the measured value of the ambient temperature T_aair and a last-stored value of the fuel temperature T_ktm(old). The maximum selection means that the greater of the two values is used in the further steps of the method as a value for the ambient temperature. In this way, it is considered that, for an external heating of the fuel (for example, through warming during the day or because of solar heating), the actual fuel temperature can be greater than the ambient air temperature.

Thereafter, in step 130, an operating counter is started. It is noted that the characteristic variable T_aair is defined as a command variable in the described embodiment because this characteristic variable influences the fuel temperature the most, independently of dynamic characteristic variables such as the road speed, and, incidentally, influences also the other characteristic variables such as the engine temperature.

After a waiting time t__ini__kttm, after which an equilibrium condition has adjusted (step 140), a check takes place in step 145 as to whether a fill level sensor (not shown) is defective. If this is the case, then, in step 147, the value (fs__tank__v) of the fill level for the last trip is assumed into a variable for the value of the actual fill level fs__tank; otherwise, step 150 follows (see FIG. 2*b*).

Figure 2B:
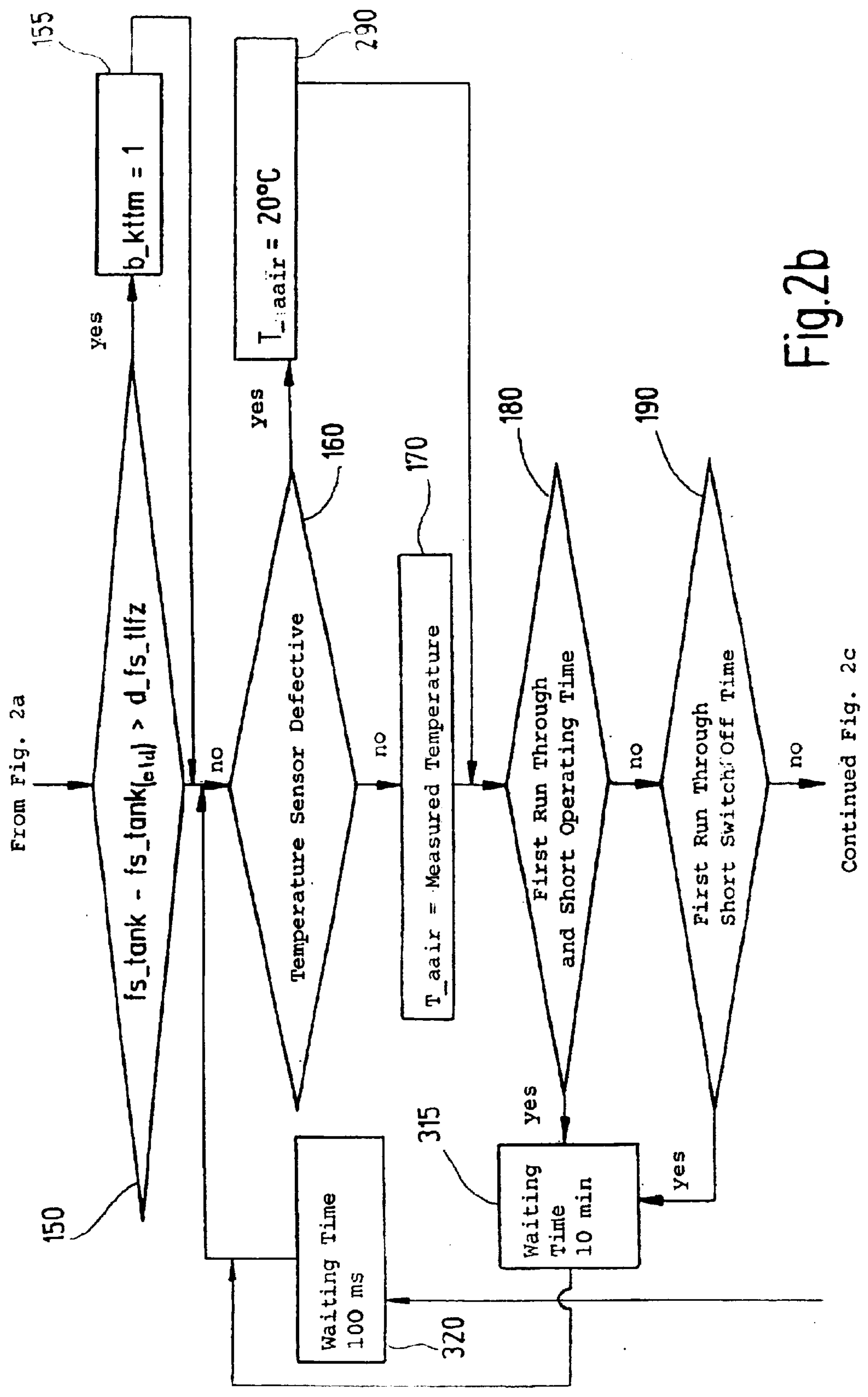

In step 150 in FIG. 2*b*, a check is made as to whether a tanking operation has taken place during an interruption in operation. For this purpose, the difference between the actual measured tank fill level fs__tank and the tank fill level fs__tank(old) is formed. The tank fill level fs__tank(old) was determined during the last trip and is assumed from the read/write memory. If this difference is greater than a pregivable value d__fs__tlfz, then it is assumed that a tanking operation has taken place and, in step 155, the value "1" is assigned to a variable for a tanking operation recognition b__kttm. This variable b__kttm serves later in step 210 as one of the selection criteria as to whether a tanking operation has taken place and, thereafter, an approximation value is determined for the fuel temperature.

Thereafter, in step 160, a check takes place as to whether the ambient temperature sensor is defective. If the difference, which is determined in step 150, is, in contrast, less than a pregiven value d__fs__tlfz, a check is made directly in step 160 as to whether the ambient temperature sensor is defective. If this is the case, then, in step 290, the value 20° C. is assigned to the variable for the ambient air temperature T__aair. Thereafter, step 180 follows wherein a check is made as to whether the engine was in operation shorter than a pregiven threshold time, for example, 30 minutes, that is, whether a criterion for a short operating time is present.

If it is, however, determined in step 160 that the ambient air temperature sensor is not defective, then, in step 170, the measured ambient air temperature is assigned to the variable for the ambient air temperature T__aair in step 180. In step 180, a check is made only in the first runthrough of the method as to whether the criterion for a short operating time is present. After a short operating time, no temperature equilibrium has adjusted, so that a new determination of the fuel temperature may not take place.

For this reason, after a waiting time of 10 minutes, the cycle starting with step 160 is again run through in step 325.

If, in contrast, it is determined in step 180 that the operating time of the engine was longer than 30 minutes, then, in step 190, a check is made only in the first runthrough of the method as to whether a criterion is present for a short shutoff time. As to a short shutoff time, a time of under 30 minutes is understood. For a short shutoff time, the fuel temperature is not changed in comparison to the last operating cycle of the engine, so that here too, a new determination of the fuel temperature may not immediately take place.

If, after the first runthrough of the method after the start of the engine, the criterion is present for a short shutoff time, then, here too, after a waiting time of, for example 10 minutes, the cycle is again carried out starting with step 160 in step 325. If the engine shutoff time was longer than, for example, 30 minutes, then, in step 200 (FIG. 2*c*), a check is made as to whether the road speed v__can is greater than zero.

This check is necessary because, for a standing vehicle, a heat buildup is formed which leads to a falsification of the determined fuel temperature. For this reason, no new determination of the fuel temperature is carried out for a vehicle at standstill; instead, after a waiting time of, for example, 100 milliseconds in step 320, the cycle is repeated in step 160 starting with the check of the temperature sensor.

If the road speed v__can is greater than zero, then, in step 220 (FIG. 2*c*), a further check is made as to whether the fill level sensor is defective. If this is the case, then, in step 225, the last stored value for the fill level for a trip fs__tank__v is assigned to the variable for the fill level fs__tank. A check of the fill level sensor at this point is necessary because, for the next tanking operation detection while the engine is running, a correct fill level value is required. For a defective tank fill level sensor, the method can be continued at least with an automatically assigned fill level value.

After step 220, a check is made in step 210 as to whether a tanking operation has taken place with the engine running, that is, during an interruption in operation. For this purpose, the difference between the actually measured tank fill level fs__tank and the tank fill level fs__tank__v, which was last measured for a vehicle speed greater than zero, is determined. If the difference is greater than a value d__fs__tel, then a tanking operation has taken place with the engine running. If the value of the variable b__kttm from step 155 is equal to "1", then a tanking operation has taken place during the last interruption in operation. If, in step 210, it results that a tanking operation has taken place, then, in step 300, the fuel temperature T__ktm is computed as a mean value from the last computed fuel temperature T__ktm(old) which is present in the read/write memory, and the ambient air temperature T__aair. This takes place in accordance with the following equation wherein the weighting can also assume other values in lieu of the factor ½ grds:

$$T\_ktm=(T\_ktm(\mathrm{old})+T\_aair)/2.$$

Figure 2C:
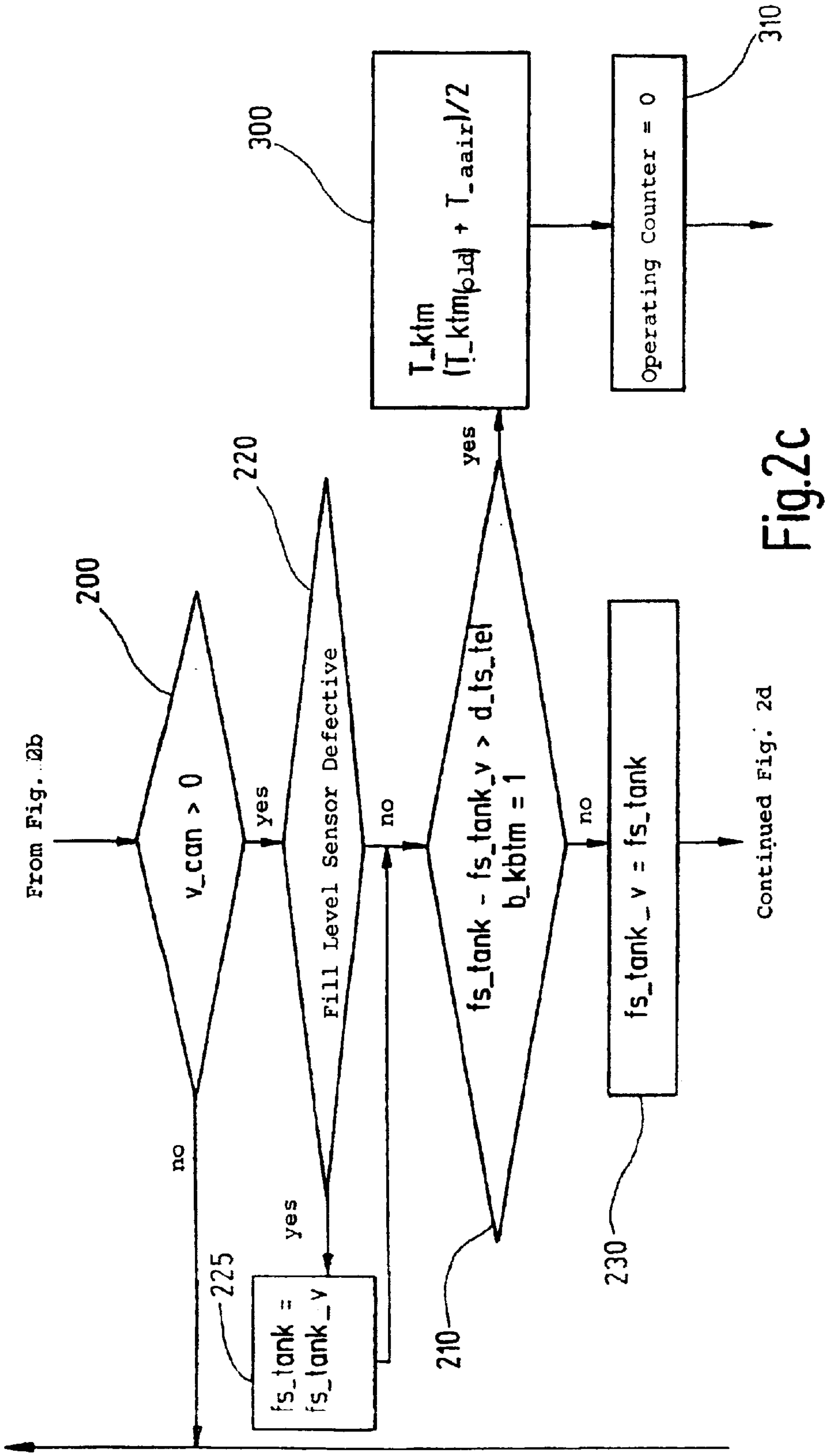
Figure 2D:
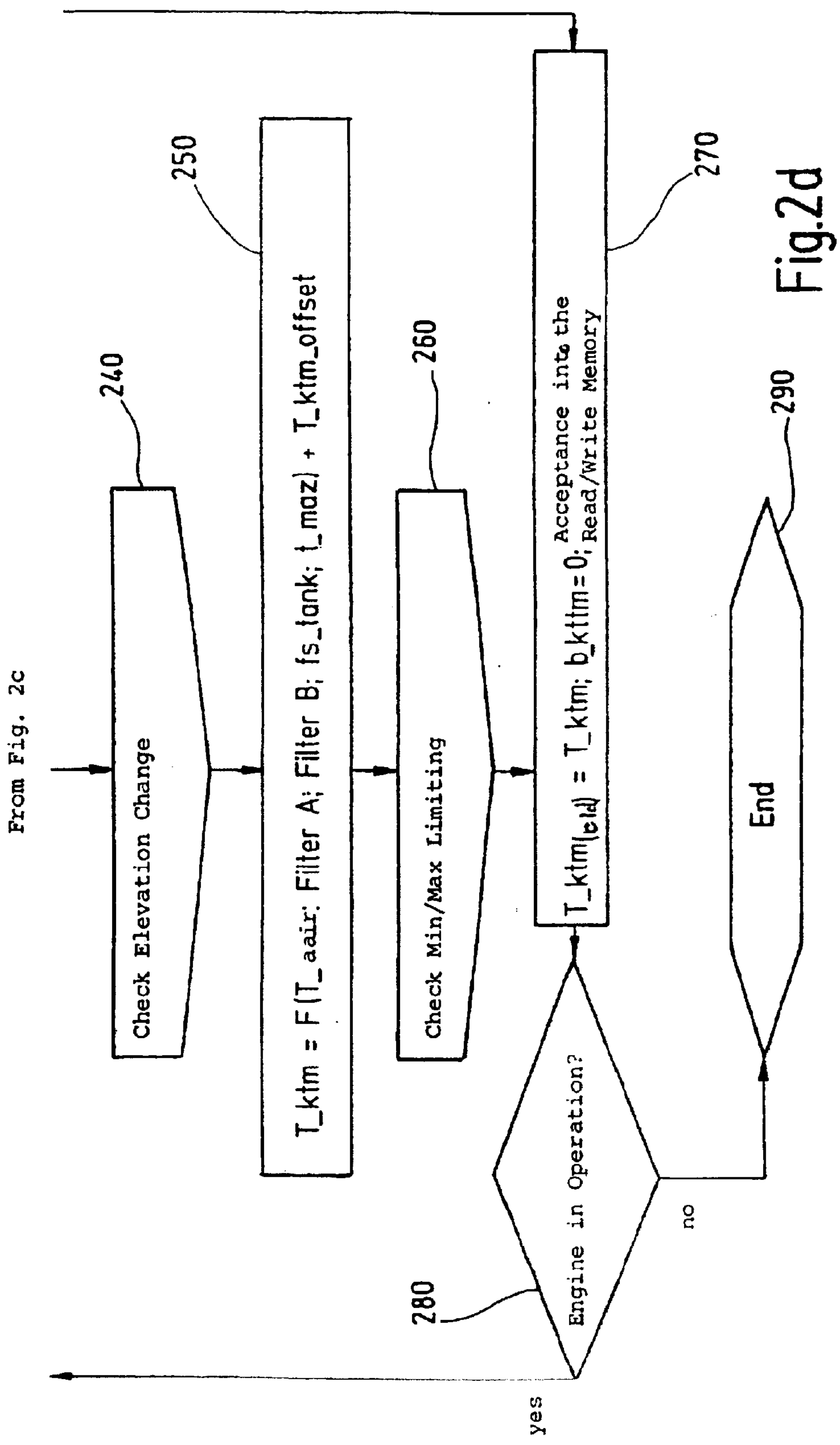

Thereafter, in step 310, the operating counter is set to zero and the method is continued directly with step 270 (FIG. 2*d*).

In step 270, the assumption of the fuel temperature T__ktm, which is valid at this time point, takes place into the read/write memory as fuel temperature T__ktm(old), which is set equal to zero, and the variable for the tanking operation recognition b__kttm is set equal to "0". Thereafter, in the event that the engine continues to be in operation, which is checked in step 280, the cycle to determine the fuel temperature is repeated in step 320 after a waiting time of 100 milliseconds starting with step 160.

The reset of the operating counter in step 310 causes the situation that the method is carried out in the same way in the next determination cycle starting at step 180 as though the engine had been started anew and the criterion for a short operating time was present. In this way, the method is continued in the first runthrough only after a waiting time of 10 minutes in step 325.

If the check in step 210 yielded that no tanking operation was carried out, then the method for a new determination of the fuel temperature is continued with step 230 (FIG. 2*c*). In step 230, the value of the measured fill level fs__tank is assigned to the variable for the fill level during the trip fs__tank__v.

Thereafter, in step 240, the check as to a geographic change in elevation is carried out. This is shown in detail in FIG. 3. The check as to whether a change in elevation has taken place is started in FIG. 3 with step 2410. The elevation can be determined with measures known per se, for example, by means of a pressure sensor based on the usual pressure dependency of the ambient air p__aair. In step 2420, a check is made as to whether there is a reduction in elevation, that is, a check is made as to whether, for example, a trip down a mountain pass is taking place. If this is the case, then, in step 2450, the temperature offset T__ktm__offset is set equal to zero; thereafter, the check as to a change in elevation is ended in step 2460 and the method for fuel temperature determination is continued in step 250 (see FIG. 2*d*). If, in contrast, no reduction of elevation is present, then, in step 2430, a check is made as to whether an increase in elevation is present. This is the case when the vehicle is in a trip up through a mountain pass. If there is an increase in elevation, then, in step 2440, the value "5" is assigned to the temperature offset T__ktm__offset. This temperature offset is later added in step 250 to the fuel temperature T__ktm computed in a circuit. In this way, the circumstance is considered that in a pass trip, the ambient air temperature reduces faster than the fuel temperature can adapt to the ambient air temperature.

Thereafter, in step 2460, the check as to change in elevation is ended and step 250 follows in FIG. 2*d*. In step 250, the fuel temperature T__ktm is computed as a function of the ambient air temperature T__aair, a damping in a mathematical filter A (which considers the manufacturing series of the vehicle and the influence of the duration of operation of the engine on the increase of the fuel temperature which can be different depending upon the chassis series and the engine series) and a damping in a mathematical filter B (which considers the fuel temperature in dependence upon the fill level of the tank, the tank fill level fs__tank and the engine shutoff time t__maz). The value of the temperature offset T__ktm__offset is added to the value of the fuel temperature determined in this manner. Thereafter, in step 260 (FIG. 2*c*), a check is made as to whether the fuel temperature T__ktm, which is so computed, lies within a pregivable temperature interval (minimum/maximum limiting).

Figure 4:
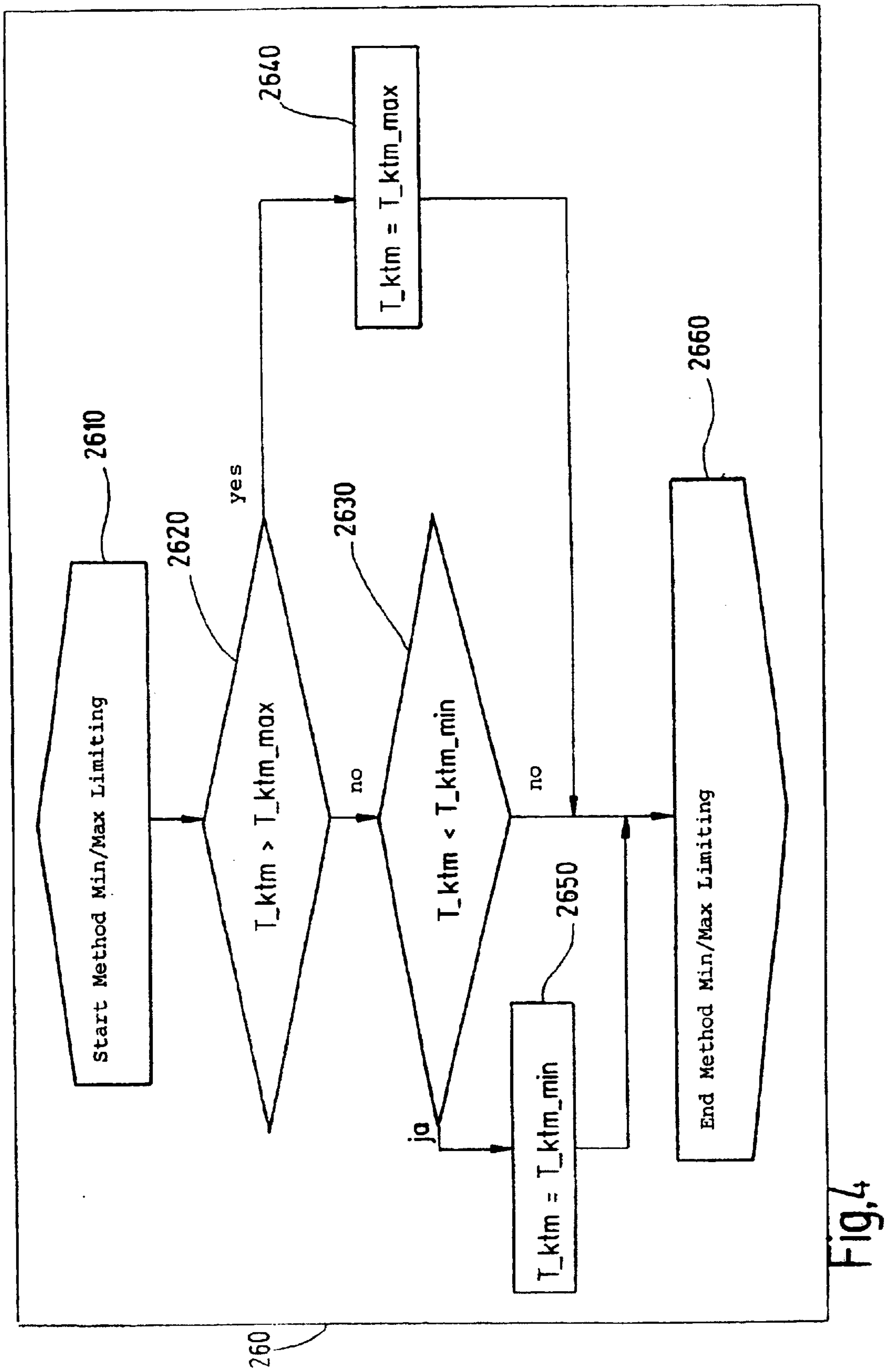
FIG. 4 is a flowchart of a method for carrying out a minimum/maximum limiting of the determined fuel temperature; and, FIG. 5 is an embodiment of a characteristic variable diagram for determining the fuel temperature from the characteristic variables of ambient temperature and tank fill level with the characteristic variables being parametricized over the quantity of time.

In FIG. 4, a flowchart of a method is shown in detail for the minimum/maximum limiting of the fuel temperature according to step 260. The method starts in step 2610. In step 2620, the check takes place as to whether the fuel temperature T__ktm, which is determined in step 250, is greater than a pregivable maximum value T__ktm__max. If this is the case, then, in step 2640, the value of the pregivable maximum temperature T__ktm__max is assigned to the variable of the computed fuel temperature T__ktm and the method for minimum/maximum limiting is ended in step 2660. Step 270 (FIG. 2) follows, wherein, in the read/write memory, the determined fuel temperature T__ktm is assigned to the variable T__ktm(old) and the value zero is assigned to the variable for the operating temperature recognition b__kttm. If the check in step 2620 results in the fact that the specific fuel temperature T__ktm is not greater than the pregivable maximum value T__ktm__max, then the check follows in step 2630 as to whether the fuel temperature T__ktm is less than a pregivable minimum value T__ktm__min. If this so, then, in step 2650, the value of the minimum temperature T__ktm__min is assigned to the variable for the fuel temperature T__ktm.

Thereafter, in step 2660, the method for minimum/maximum limiting is ended and step 270 follows (FIG. 2*d*).

In FIG. 2*d*, with step 270, the value of the so determined fuel temperature T__ktm is stored in the read/write memory as variable T__ktm(old). Furthermore, the value zero is assigned to the variable for the tanking operation detection b__kttm and stored. Thereafter, in step 280, a check is made as to whether the engine is still in operation and, if this is not the case, then the method is ended (step 290). Otherwise, the above-mentioned method for determining the fuel temperature is carried out anew (step 320) after a waiting time of 100 milliseconds starting with step 160 in FIG. 2*a*.

It is understood that the individual method steps for determining the fuel temperature T__ktm can also take place in another sequence. It is also possible that different steps can be combined. For this purpose, the results from branchings and inquiries are intermediately stored in corresponding variables in order to be considered in a final computation. For the time inputs and temperature inputs given, we are concerned here only with exemplary inputs which can be changed in their magnitude.

Furthermore, it is understood that the detection of a tanking situation after an interruption of operation and the detection of a tanking operation for a running engine can be combined. For this purpose, the variable b__kttm is assigned the value "1" for a tanking operation during an interruption operation as well as for a tanking operation with the engine running. This value is then applied for later decision steps or computations.

For detecting a tanking operation, preferably the tank fill level, the road speed, and the tank fill level during the last trip serve as initialization values for a sequencing of logic connections and computations in circuits in a manner known per se.

In principle, with the approximate computation of the fuel temperature after a tanking operation, the tanked quantity can also be considered, especially since, for a larger quantity of fuel, the influence of changes of the ambient air temperature on the fuel temperature is less and therefore a correction of the computed quantity with the fuel quantity can take place.

Figure 3:
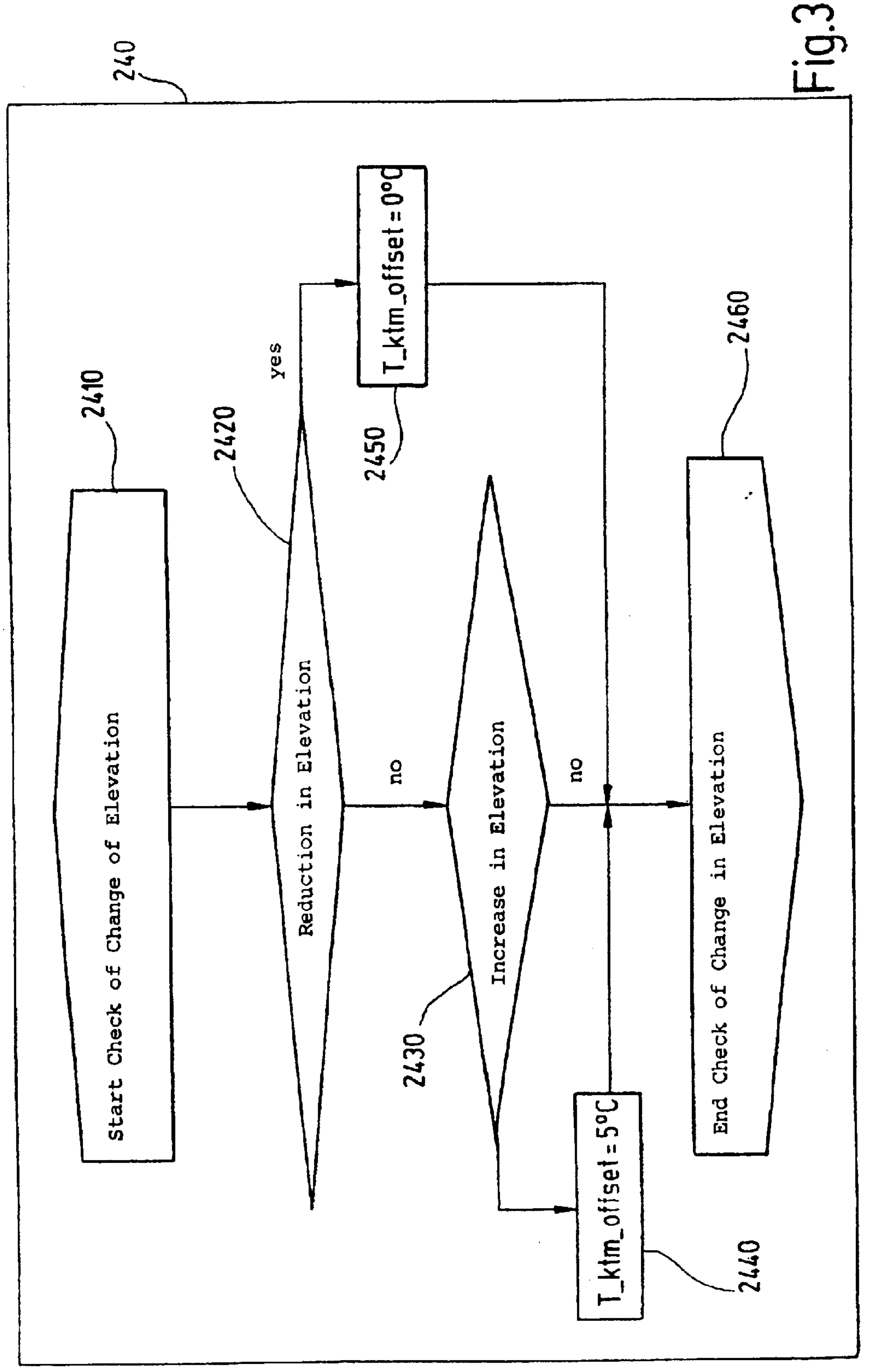
FIG. 3 is a flowchart of a method for checking a change in elevation wherein a temperature offset is set.

In the flowcharts shown in FIGS. 1 to 3, one can assume in most cases that the measured values are present in a processor of the vehicle known per se and that likewise announcements as to a sensor defect known per se are available (fill level sensor or temperature sensor).

The counter for the engine shutoff time is started when switching off the engine and stopped as soon as the engine is started again. The shutoff time determined in this manner is stored in the read/write memory as variable t__maz.

It is understood that in addition to the measurement values or corrective values, also other variables which are available can be applied for optimizing the determination of the fuel temperature T__ktm. Furthermore, it is understood that the method can also be carried out for determining a temperature of any desired liquid in any desired vessel. In lieu of or in supplement to the engine, at least one further heat generating source and/or cold generating source (for example, a climate control or a cooling apparatus of the engine) can be considered.

Figure 5:
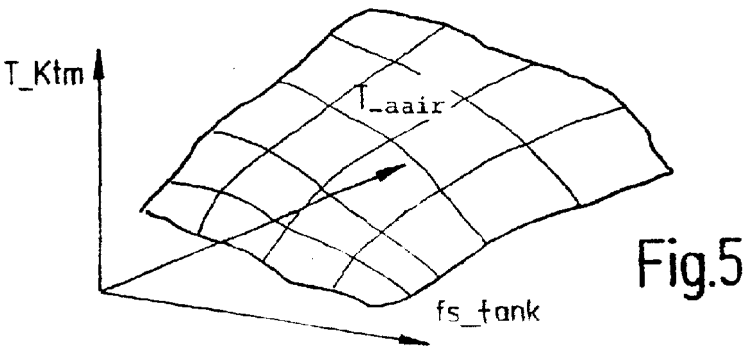

The embodiment shown in FIG. 5 of a characteristic variable diagram can be utilized in the described method for the purpose already mentioned. In the embodiment, T__ktm is plotted as a function of T__aair and fs__tank. The shown family of curves is parameterized over the time t. The described model computation forms a basis of the dependency of T__ktm as a function of T__aair and fs__tank shown in the characteristic variable diagram. In cases in which the shown characteristic variables are already detected in the control apparatus, the characteristic variables diagram can be automatically generated and T__ktm can be read out without further measures from the control apparatus by machine. It is noted that the characteristic variables diagram in the case n−1 of additional characteristic variables and for the shown parametrization is configured n-dimensional with the time t.

It is understood that the foregoing description is that of the preferred embodiments of the invention and that various changes and modifications may be made thereto without departing from the spirit and scope of the invention as defined in the appended claims.

What is claimed is:

1. A method for monitoring the emissions of a supply vessel storing a volatile medium during operation including a fuel supply tank of a motor vehicle, the method comprising the steps of:

determining the temperature of said medium based on at least one characteristic variable utilizing a model computation from time-to-time or cyclically; and, either carrying out a tightness check of said supply vessel by utilizing said temperature or carrying out a tightness check only when the determined temperature of said medium lies within a pregivable temperature interval.

2. The method of claim 1, wherein said characteristic variable is the ambient temperature.

3. The method of claim 1, wherein said supply vessel has a fill level and said fill level is used as an additional characteristic variable.

4. The method of claim 1. wherein said supply vessel is a fuel tank of a motor vehicle; and, an operating variable of said motor vehicle is used as a further operating variable.

5. The method of claim 4, wherein an identifying data of the vehicle series is utilized as an additional operating variable.

6. The method of claim 1, wherein a change of the fill level of the supply vessel is detected based on a tanking operation and is considered in the model computation.

7. The method of claim 6, wherein the tanking operation is detected in that, after the start of the vehicle engine, the difference between the instantaneous fill level of the tank and an intermediately stored tank fill level value exceeds a pregivable threshold value.

8. The method of claim 1, wherein, in the case of a detected defect of a temperature sensor or fill level sensor, a pregivable substitute value is assigned to a corresponding temperature variable in the model equation or an instantaneously determined temperature value of the medium is replaced by a stored temperature value.

9. The method of claim 1, wherein a plausibility check is carried out wherein an instantaneously present temperature value of said medium is compared to a pregivable upper and/or lower limit value and is only accepted when the temperature value lies within these limit values.

10. The method of claim 9, wherein the temperature value is set equal to one of said limit values when one of said limit values is exceeded.

11. A method for monitoring the emissions of a supply vessel storing a volatile medium during operation including a fuel supply tank of a motor vehicle, the method comprising the steps of:

determining the temperature of said medium based on at least one characteristic variable utilizing a model computation from time-to-time or cyclically;

either carrying out a tightness check of said supply vessel by utilizing said temperature or carrying out a tightness cheek only when the determined temperature of said medium lies within a pregivable temperature interval;

wherein said supply vessel is a fuel tank of a motor vehicle; and, an operating variable of said motor vehicle is used as a further operating variable; and, wherein the shutoff duration of the motor vehicle is included in the model computation of the temperature of said medium; and, a cool-down curve, which is specific for a manufactured series, is stored and is used as a start value for the engine temperature.

12. A method for monitoring the emissions of a supply vessel storing a volatile medium during operation including a fuel supply tank of a motor vehicle, the method comprising the steps of:

determining the temperature of said medium based on at least one characteristic variable utilizing a model computation from time-to-time or cyclically;

either carrying out a tightness check of said supply vessel by utilizing said temperature or carrying out a tightness check only when the determined temperature of said medium lies within a pregivable temperature interval; and, wherein the temperature of said medium, which is modeled based on said at least one operating variable, is stored via said at least one characteristic variable in the form of a characteristic variable diagram.

13. The method of claim 1, wherein the temperature of said medium is only determined from said at least one characteristic variable when said at least one characteristic variable lies within a pregivable variance width.

14. A method for monitoring the emissions of a supply vessel storing a volatile medium during operation including a fuel supply tank of a motor vehicle, the method comprising the steps of:

determining the temperature of said medium based on at least one characteristic variable utilizing a model computation from time-to-time or cyclically;

either carrying out a tightness check of said supply vessel by utilizing said temperature or carrying out a tightness check only when the determined temperature of said medium lies within a pregivable temperature interval;

wherein said supply vessel is a fuel tank of a motor vehicle; and, an operating variable of said motor vehicle is used as a further operating variable; and, wherein the temperature of said medium is only determined when the vehicle speed and/or the duration of operation of the vehicle motor exceeds a pregivable limit value.

15. The method of claim 14, wherein said limit value is fixed in dependence upon the manufacturing series of the vehicle motor and/or of the chassis form of the vehicle including for individual vehicle manufacturing series separately.

16. A method for monitoring the emissions of a supply vessel storing a volatile medium during operation including a fuel supply tank of a motor vehicle, the method comprising the steps of:

determining the temperature of said medium based on at least one characteristic variable utilizing a model computation from time-to-time or cyclically;

either carrying out a tightness check of said supply vessel by utilizing said temperature or carrying out a tightness check only when the determined temperature of said medium lies within a pregivable temperature interval; and, wherein a temperature value of said medium, which is determined in the operation of said supply vessel and/or of the vehicle, is intermediately stored and, when the supply vessel is subsequently used and/or the vehicle is used, is compared to a measured instantaneous ambient temperature, and, until a subsequent determination of the temperature of the medium based on the model computation, the larger of the two values is applied as a start value for the temperature of the medium.

17. A method for monitoring the emissions of a supply vessel storing a volatile medium during operation including a fuel supply tank of a motor vehicle, the method comprising the steps of:

determining the temperature of said medium based on at least one characteristic variable utilizing a model computation from time-to-time or cyclically;

either carrying out a tightness check of said supply vessel by utilizing said temperature or carrying out a tightness check only when the determined temperature of said medium lies within a pregivable temperature interval;

wherein a change of the fill level of the supply vessel is detected based on a tanking operation and is considered in the model computation;

wherein the tanking operation is detected in that, after the start of the vehicle engine, the difference between the instantaneous fill level of the tank and an intermediately stored tank fill level value exceeds a pregivable threshold value; and, wherein the quantity of the after-tanked medium is included in the model computation when there is a new computation of the temperature of the medium.

18. A circuit comprising circuit means for carrying out a method for monitoring the emissions of a supply vessel storing a volatile medium during operation including a fuel supply tank of a motor vehicle, the method including the steps of:

determining the temperature of said medium based on at least one characteristic variable utilizing a model computation from time-to-time or cyclically; and, either carrying out a tightness check utilizing said temperature or carrying out a tightness check only when the determined temperature of said medium lies within a pregivable temperature interval;

the circuit further comprising first and second stages wherein each stage defines a filter for the influence of the particular characteristic variable on the temperature of the medium; and, the attenuation of the particular filter is varied in dependence upon the characteristic variable and a corrective quantity dependent upon the ambient; and, wherein at least two filters form the basis of the model computation; the ambient temperature and/or the elevation of the supply vessel or of the vehicle are included in the first filter; the fill level of the supply vessel and/or the vehicle shutoff time and/or the vehicle shutoff time and/or the vehicle motor shutoff time and/or the operating duration of the supply vessel or of the vehicle are included in the second filter.

19. A control apparatus comprising a control program for carrying out a method for monitoring the emissions of a supply vessel storing a volatile medium during operation including a fuel supply tank of a motor vehicle, the method comprising the steps of:

determining the temperature of said medium based on at least one characteristic variable utilizing a model computation from time-to-time or cyclically; and, either carrying out a tightness cheek of said supply vessel utilizing said temperature in said tightness check or carrying out a tightness check only when the determined temperature of said medium lies within a pregivable temperature interval.

20. The control apparatus of claim 19, further comprising a read/write memory (RAM) for storing the one characteristic variable diagram and/or for intermediately storing a determined temperature value of said medium.

* * * * *

UNITED STATES PATENT AND TRADEMARK OFFICE

CERTIFICATE OF CORRECTION

PATENT NO. : 6,829,555 B2
DATED : December 7, 2004
INVENTOR(S) : Juergen Penschuck and Uwe Dworzak It is certified that error appears in the above-identified patent and that said Letters Patent is hereby corrected as shown below:

Column 11,
Line 20, delete “claim 1.” and insert -- claim 1, -- therefor.
Line 57, delete “cheek” and insert -- check -- therefor.

Column 14,
Line 23, delete “cheek” and insert -- check -- therefor.

Signed and Sealed this

Twenty-second Day of February, 2005

JON W. DUDAS
*Director of the United States Patent and Trademark Office*